Nov. 8, 1927. 1,648,586
M. M. KOHN
AUTOMATICALLY CONTROLLED VULCANIZER
Filed Feb. 25, 1925 4 Sheets-Sheet 4
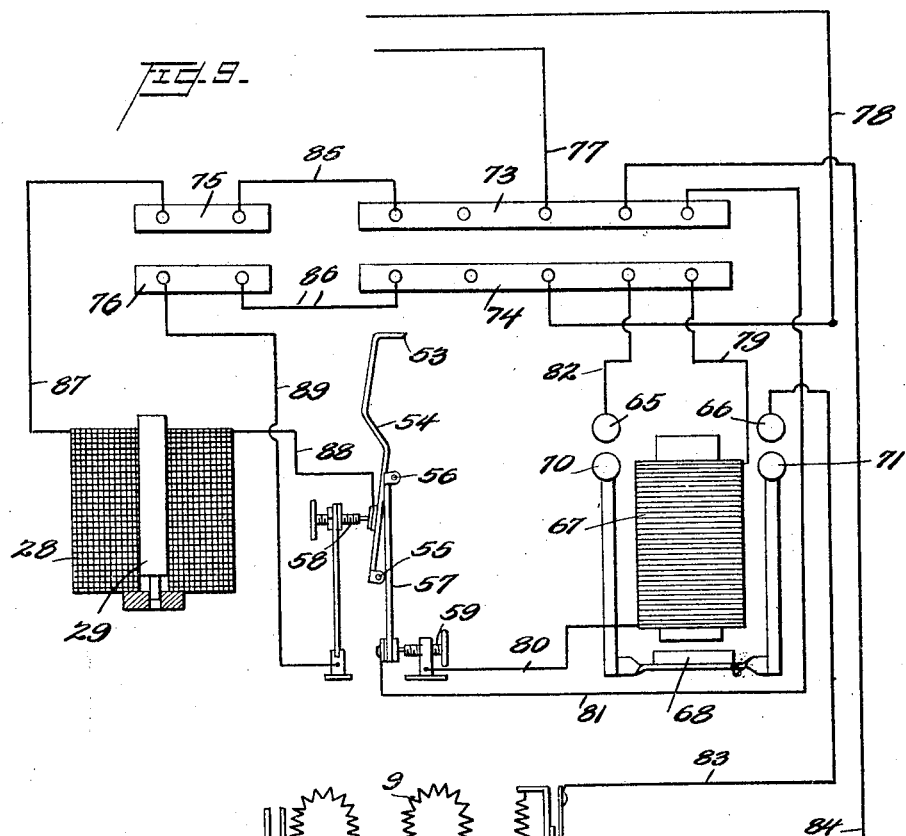
FIG. 9.
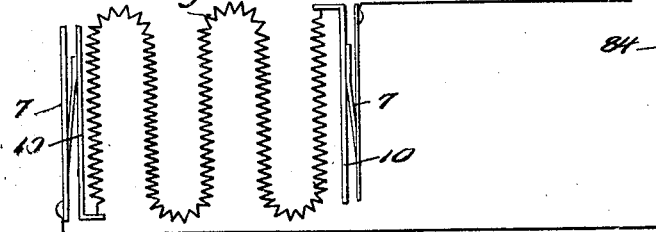
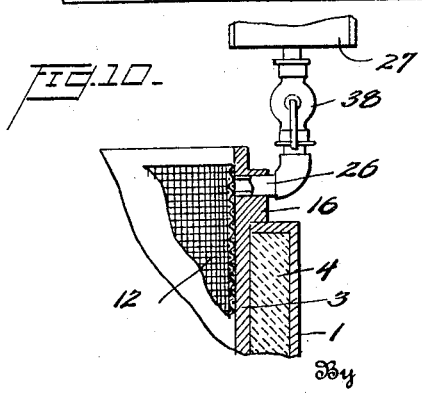
FIG. 10.
Inventor
Milton M. Kohn
By H. Brooks
Attorney Patented Nov. 8, 1927.

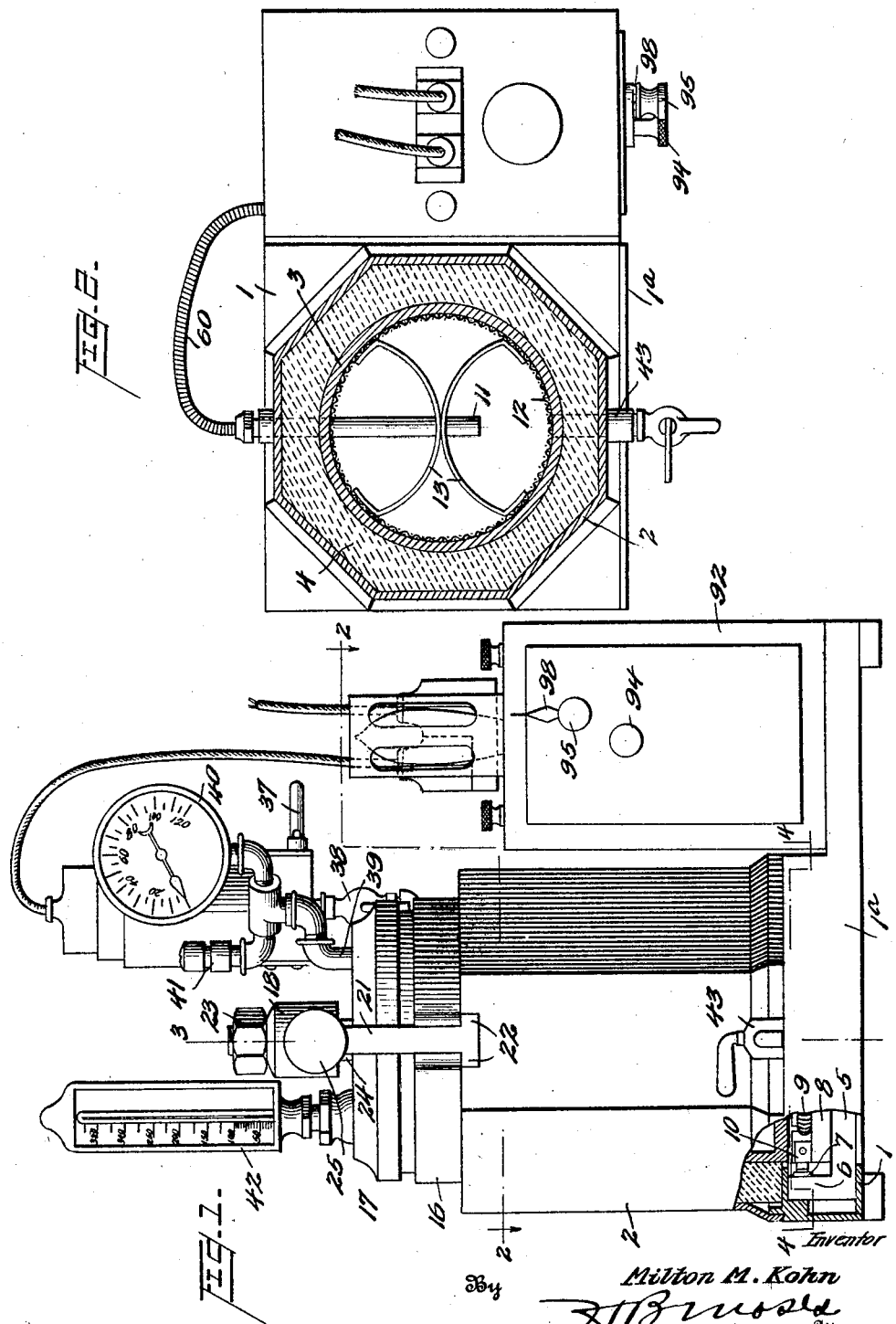

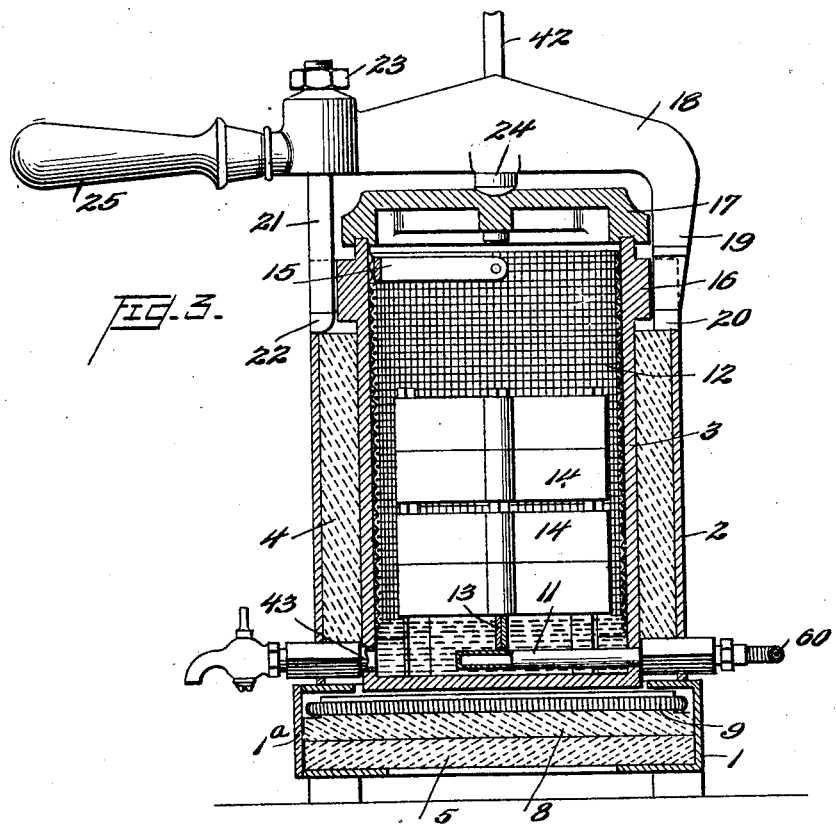
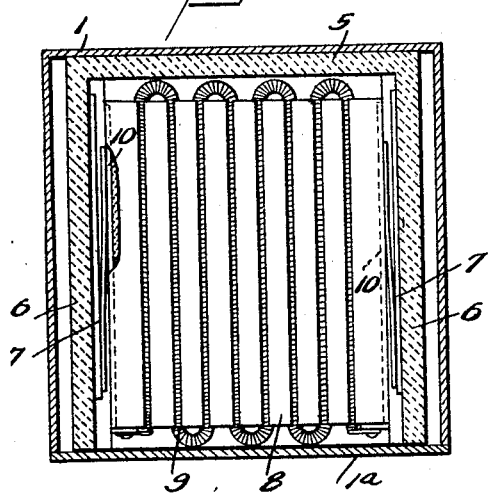
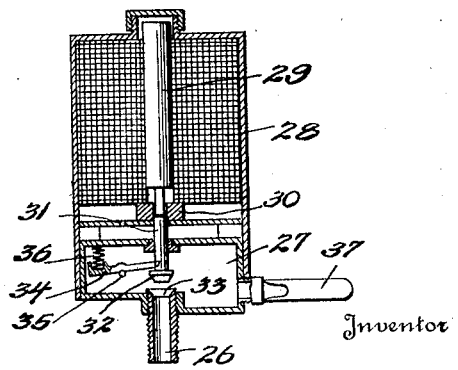

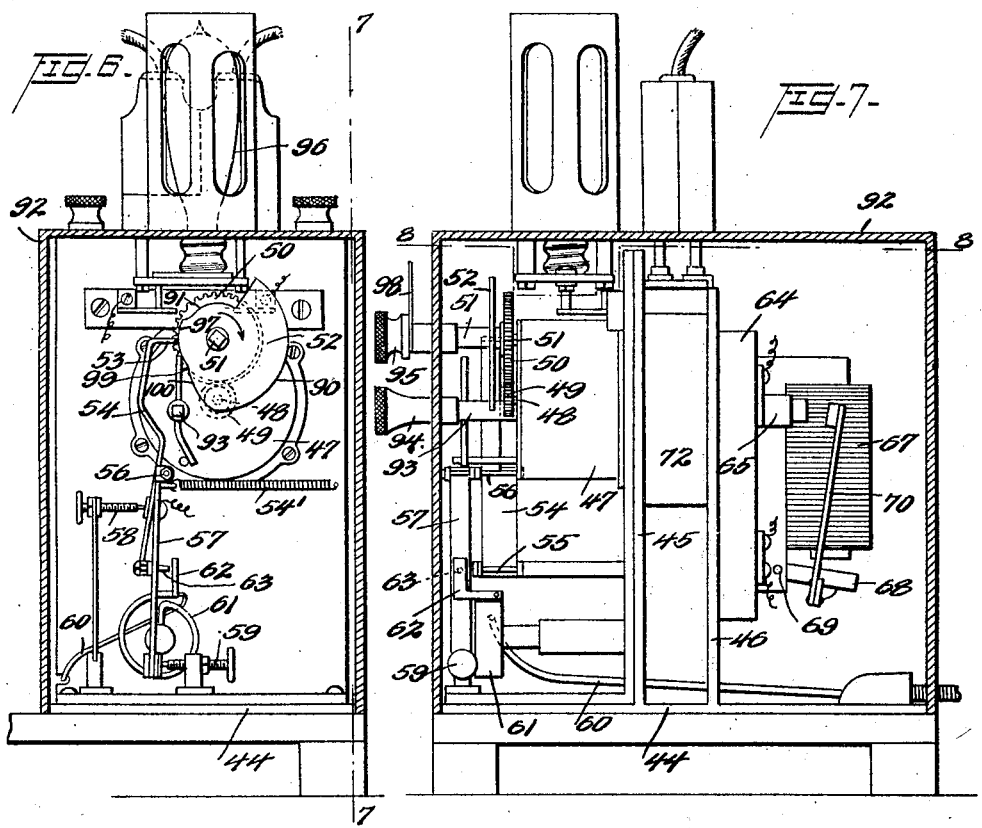
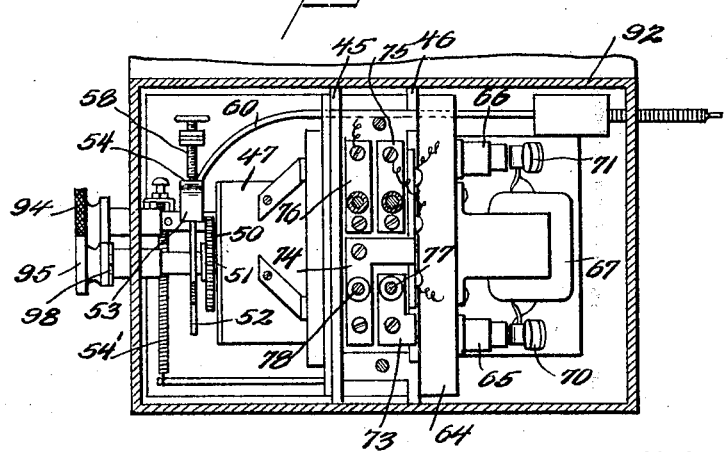

1,648,586

UNITED STATES PATENT OFFICE.

MILTON M. KOHN, OF NEW YORK, N. Y.

AUTOMATICALLY-CONTROLLED VULCANIZER.

Application filed February 25, 1925. Serial No. 11,513.

This invention relates to automatic vulcanizers of the electric heating type, and one of the objects thereof is to provide a controlling device for automatically regulating the heat so that when the proper degree of heat is attained, mechanism is put into operation for holding the heat at such degree for a prescribed period during which the vulcanization takes place.

Another object of the invention is the provision of a temperature controlling means within the vulcanizing chamber and in immediate contact with the liquid contained within the said chamber.

Another object of the invention is the provision of an electrical heating means, controlled by a temperature controlling means disposed within the vulcanizing chamber.

Another object of the invention is the provision of a time element or clock mechanism for retaining the temperature within the vulcanizing chamber at a predetermined degree for a prescribed time, the operation of which is suitably controlled by the temperature controlling means disposed within the vulcanizing chamber.

A further object of the invention is the provision of an electrically controlled air valve disposed in the top of the vulcanizing chamber, for allowing the air to escape as the vulcanizing chamber is heated, and to close when a predetermined temperature has been reached within the chamber.

A further object of the invention is the provision of a perforated cylindrical basket within the vulcanizing chamber for supporting the dental flasks placed therein.

A still further object of the invention is to so dispose the electric heating elements and the connections therefor that they may be readily withdrawn and new similar devices installed in place thereof without disorganization of the remaining elements of the vulcanizer.

In order to properly vulcanize rubber, it is necessary that the specific temperature at which the rubber reacts with the sulphur be maintained for a definite period of time without any material fluctuation whatsoever, for if the temperature is too high or too low, or the temperature fluctuates only to a varied extent, the vulcanization will be incomplete and unsatisfactory. In the vulcanizers adapted for dental work now in use it is impossible to carry on the vulcanization with complete certainty as to results, due to the fact that the temperature within the vulcanizing chamber cannot be maintained substantially uniform for a definite period of time, for example, one or two hours or longer, depending upon the particular article or articles to be vulcanized. I have now devised an electric automatic vulcanizer which merely necessitates the turning on of a switch to start the device, and no further attention and care is required on the part of the attendant until another article is to be vulcanized. By means of my vulcanizer, the heating of the chamber in which the articles to be vulcanized are placed to a predetermined temperature, the removal of the air confined within the vulcanizing chamber, the retention of the predetermined temperature for a definite period of time, the stopping of the vulcanizer when the time period has elapsed, and the release of the pressure within the vulcanizing chamber, are all automatically carried out in the sequence noted above, thus requiring no attention of an attendant during the operation of my vulcanizer. All of these operations are controlled by an electric relay system to which are connected a temperature recording element disposed within the vulcanizing chamber, a heating element for heating the chamber, and a blow-off valve mounted in the cover of the chamber. Interposed within the electric relay system is a clock mechanism provided with a cam disc of a predetermined shape suitably connected to the temperature recording means disposed within the vulcanizing chamber which determines the time period of the operation of my device.

Heretofore, in order to determine the temperature existing within the vulcanizing chamber, a thermometer, or equivalent temperature recording device, was supported in the cover or lid of the chamber, but this is unsatisfactory, due to the fact that the temperature is only recorded as it exists in the vicinity of the temperature bulb. I have now found that by having a temperature or pressure recording or controlling instrument disposed in the bottom of the chamber and in immediate contact with the liquid contained within the said chamber, I am able to have the temperature or pressure changes occurring within the chamber recorded, so to speak, instantaneously. By using a thermometer which contains preferably a volatile liquid, and connecting this with an electric circuit having connected thereto the heating means for raising the vulcanizing chamber to a definite temperature, I am able to prevent the temperature within the vulcanizing chamber from rising above or dropping below a predetermined degree. This controlling mechanism consists of a special Bourdon tube, arranged with a flat contact on the open end, the closed end of this tube being connected by means of a flexible metal tube to the thermometer bulb which is filled with a preferably volatile fluid, the thermometer bulb being disposed in the bottom of the vulcanizing chamber and connected to the flexible metal tube by means of a steam tight connection. A pivoted lever is attached to the base of the vulcanizer and is mounted in close proximity to the Bourdon tube and in such manner that a movement of the Bourdon tube caused by the expansion of the volatile liquid will cause a contact to be made with suitable contact pieces carried by this lever, and in this way automatically control the current going into the heater, so that any desired temperature can be indefinitely maintained, the contact pieces carried by this lever being capable of adjustment.

The means controlling the time interval for holding the temperature within the chamber for a prescribed period of time consists of a small clock which is equipped with a special spindle, and a special cam geared to the clock mechanism and contained within the clock case. By the use of this special shaped cam the time required from the starting of the vulcanizing operation up to its completion may be shortened or lengthened as desired. This cam is so cut that the surface which is in mechanical contact with the end of the pivoted lever allows the lever to move in relation to the revolution of the cam. This lever is so pivoted and arranged that if it is in any definite position the contact controlled by the Bourdon tube can make contact with the lever. If, however, the cam is in any other position, it will be moved away from the contact of the Bourdon tube, thereby breaking the electric circuit, the result of this being that the current will flow through the heating element for heating the chamber and will continue to heat the chamber. As soon as the predetermined temperature has been reached, the Bourdon tube makes a contact with the pivoted lever and this lever in turn is held in any desired position by the cam for the required period of time, thereby opening the circuit controlling the heating element and allows the heater to cool.

Another feature of my vulcanizer is the inclusion of an air vent valve mounted in the cover of the vulcanizing chamber, the operation of this air valve being electrically controlled. When the vulcanizing operation is started, and the chamber is thereby given a preliminary heating, the air is allowed to escape through this air valve, but as soon as a certain temperature has been reached within the vulcanizing chamber, the air valve automatically closes. This air valve is controlled by the same electrical mechanism as controls the heating element for heating the vulcanizing chamber. This electrically operated air valve includes, in addition to an air vent, an alarm. The electrical elements which control the operation of this air valve consist of a specially wound magnet or solenoid connected to the pivoted lever in such manner that when the predetermined time interval has expired the electric circuit through the heating element and the control mechanism is opened by means of this solenoid.

My invention includes means for not only electrically heating the vulcanizer to a predetermined temperature in a predetermined time, but also means to hold that predetermined temperature for a predetermined time, and also to increase the temperature to a predetermined degree for a predetermined period of time, and means for automatically cutting off the heat when the work is completed, such completion being indicated by signaling means such as a whistle, a bell, or the like, the entire operation being performed automatically.

The dental flasks commonly in use for making dental dentures are of two kinds, namely: that known as the Whitney type, which flasks are usually placed in the vulcanizing chamber, one on top of the other; and the other known as the Dunham type, which are placed one on top of each other and held together by means of clamps. Both of these types of flasks are not easily removed after the vulcanization is complete, due to the fact that no provision is made for removing them when the pot is extremely hot. I have now found that by the use of a perforated cylindrical basket which is made of either sheet metal or wire mesh, in which the flasks are placed and the basket then placed into the vulcanizing chamber, that when the vulcanizing operation is complete they can be easily removed and do not necessitate waiting until the heater has been cooled sufficiently.

On the accompanying drawings:

Fig. 1 is a front elevation of a dental vulcanizer, embodying my invention;

Fig. 2 is a horizontal section on the line 2—2 of Fig. 1;

Fig. 3 is a vertical section through the vulcanizer pot on the line 3—3 of Fig. 1;

Fig. 4 is a horizontal section through the base on the line 4—4 of Fig. 1, showing the heating element;

Fig. 5 is a vertical section through the magnet and valve controlling the steam outlet;

Fig. 6 is an elevation of the heat controlling means, showing the casing in section;

Fig. 7 is a vertical section on the line 7—7 of Fig. 6;

Fig. 8 is a horizontal section on the line 8—8 of Fig. 7;

Fig. 9 is a diagrammatic view of the electric current circuit; and

Fig. 10 is a detail vertical section of the connection between the top of the pot and the steam controlling valve.

Referring to the drawings, a hollow base 1 supports a metal casing 2, the latter enclosing a vulcanizer pot 3 but spaced therefrom. Heat insulating means 4, such as asbestos or a form of fine brick, surrounds the pot, filling the space between the casing and the pot, to help retain heat in the latter.

The base 1 is hollow beneath the pot 2 and secured in this hollow portion is a piece of fire brick 5 having short upturned flanges 6, to which are secured metal strips 7 which act as conductors. An electric heating unit 8 lies on the fire brick 5, between the flanges 6. This heating unit is made of fire brick having grooves therein to receive the electric coil 9, as shown in Fig. 4, and at each side edge is provided a metal strip 10, which contacts with the strips 7, the ends of the coil 9 being secured to the strips 10. The bottom of pot 3 is just above the heating unit 8 and not quite touching the same, so that the heating unit can readily be removed by opening the hinged front face 1ª of the base 1, and removing the unit.

Projecting into pot 3, a distance a little more than half its diameter, and just out of contact with the inner wall of the bottom of the pot, is a tube 11, filled with a volatile fluid. This tube projects out of the casing 2 and communicates with the electric control means for a purpose which will hereinafter be explained. A basket 12 of wire mesh snugly fits within the pot 3, its bottom being formed of two curved strips 13, as clearly shown in Fig. 2. These strips support the flasks 14 and at the same time allow the water and steam to freely circulate. A bail 15 is provided to aid in removing the basket from the pot, and can be folded down out of the way as shown in Fig. 3.

The pot 3 has an annular flange 16 extending over the fire brick 4, and the wall of the pot which extends slightly above the flange is closed by a top plate 17. To securely hold the top plate on the pot, I provide a yoke 18 having at one end a downwardly projecting arm 19 provided with lugs 20, which fits in notches under the flange 16. Diametrically opposite to arm 19 is a rod 21 having at one end lugs 22 which fit in a notch under flange 16, similar to lugs 20, and its other end which is threaded extends upwardly through an opening in yoke 18 and is provided with a nut 23. Yoke 18 has a lug 24 which engages the top plate 17, and it will readily be seen that by tightening nut 23 the top plate will be securely clamped on pot 3, making a steam tight joint. Yoke 18 may be provided with a handle 25 to facilitate handling.

A short pipe 26 for the escape of steam communicates with the top of pot 3, and its other end opens into a chamber 27. Located above the chamber is a magnet 28 having a movable core 29, the latter having a reduced end, extending downwardly through an iron block 30 and in engagement with the stem 31 of a valve 32, which is directly in line with a valve seat 33 in the end of pipe 26. When magnet 28 is energized by means to be described later, the core 29 is moved downwardly closing valve 32 on its seat, and holding the steam in pot 3 to build up the temperature. To open the valve, I provide in the chamber 27 a lever 34, pivoted at 35, one end seated in a notch in stem 31, and the other end being acted on by a spring 36. When the magnet is de-energized, spring 36 acting through lever 34 will raise valve 32 off of its seat, allowing steam to enter chamber 27 from where it can escape to the atmosphere through a whistle 37, which also acts as a signal. A valve 38 may be placed in pipe 26 to prevent the steam escaping from pot 3 into chamber 27. Secured in the top plate 17 is a pipe 39, carrying a gauge 40 and a safety valve 41, as shown in Fig. 1, and a thermometer 42 may also be secured to the top plate to indicate the temperature in the pot. A valve controlled outlet 43 communicates with the bottom of the pot to allow the draining of the same.

I find it desirable to provide means for controlling the amount of heat delivered to the vulcanizer and also the length of time for heating the same, and included in said control are automatic means to cut off the heat if the vulcanizer gets too hot, as well as other means to cut off the heat after a predetermined length of time. All of this control will now be described.

Secured to the base 1, adjacent to the vulcanizer proper, is a plate 44 having two upright members 45 and 46, to which all the control mechanism is fastened. An ordinary clock mechanism in a casing 47 is fastened to upright 45, and a shaft 48, which is the minute hand shaft, projects beyond the casing and has secured thereon a gear wheel 49, the latter meshing with a large gear 50 on a shaft 51. Also secured on shaft 51 is a cam plate 52, against the edge of which one end 53 of a lever 54 bears. This lever 54 is pivoted at 55 and in turn has pivoted to it between its end on a pin 56 a second lever 57, as shown in Figs. 6 and 7. A spring 54' tends to keep the upper end 53 of lever 54 in engagement with cam plate 52 and near its lower end this lever always bears against an electric contact 58, in circuit with the magnet 28. Normally lever 57, at its lower end, bears against an electric contact 59, but if the vulcanizer becomes too hot this contact is broken and the circuit opened, as will now be explained.

Tube 11 is filled with highly volatile liquid, which quickly vaporizes when the vulcanizer is heated. This tube is connected by a tube 60 of very small diameter with a Bourdon tube 61, located adjacent the lower end of lever 57, and having a lug 62 in line, and just out of engagement, with a pin 63 on the lever 57. If for some reason the vulcanizer heats up too quickly, the Bourdon tube will expand, lug 62 will strike pin 63, and move lever 57 away from contact 59, breaking the circuit and cutting off the heat.

Mounted on upright 46 is a block 64 carrying two contacts 65 and 66, and a magnet 67. An armature 68 is pivoted at 69 and carries two arms 70 and 71, which, when the magnet is energized and attracts armature 68, bear against contacts 65 and 66 and close the circuit to the heating coil 9. Secured between uprights 45 and 46 is a block of insulation 72, carrying plates 73, 74, 75 and 76 to which various wires of the different circuits are connected.

By reference to Fig. 9, it will be seen that electric current is led to the apparatus by wires 77 and 78 connected to plates 73 and 74, respectively. A wire 79 connects plate 74 to magnet 67 and wire 80 runs from the magnet to the contact 59, wire 81 connecting lever 57 to plate 73. A wire 82 connects contacts 65 with plate 74 and contact 66 is connected to one end of heating coil 9 by a wire 83, the other end of the coil being connected to plate 73 by a wire 84. Thus it will be seen that when magnet 67 is energized it will attract armature 68, bringing arms 70 and 71 against contacts 65 and 66, closing the circuit to the heating coil. If the vulcanizer heats up too quickly, through the expansion of the Bourdon tube, lever 57 will be moved away from contact 59, breaking the circuit to the magnet. This will cause arms 70 and 71 to drop away from contacts 65 and 66, opening the circuit and cutting off the heat.

Plates 75 and 76 are connected to plates 73 and 74 by wires 85 and 86, respectively. A wire 87 connects plate 75 to magnet 28, and a wire 88 connects the magnet to lever 54, the circuit being completed through contact 58 and a wire 89, connecting the contact to plate 76. Thus it will be seen that when the current is on, magnet 28 is always energized, except when end 53 of lever 54 drops from the high part 90 of the cam 52 to the low part 91. When this takes place, the circuit is broken between lever 54 and contact 58, the magnet is deenergized, and steam from the vulcanizer will open the valve 32 and pass out the whistle 37, notifying the operator that the vulcanizing is complete.

A casing 92 covers all of the control mechanism, and a shaft 93 projects outside the casing, the said shaft having a knob 94 to allow winding of the clock mechanism. Shaft 51 carrying cam 52 also projects through the casing and has a knob 95 to allow setting of the cam. An electric light 96 may be mounted on casing 92, as a signal, the light being lit when current is turned on, and being out when the circuit is broken.

The operation is as follows:

The clock is wound enough to run about two hours and the cam is set with edge 53 of lever 54 bearing against the concentric surface 97 of the cam, the position being about as shown in Fig. 6, a pointer 98 connected to knob 95 registering with a mark on the casing to show the position. Water to about the level indicated in Fig. 3 is placed in the pot 3 and the current turned on. In about 20 minutes the point 99 of the cam plate will have reached the edge 53 of lever 54 and the temperature in the pot will be about 225°. If before this time the temperature should rise above this mark, tube 61 will expand, breaking the current between lever 57 and contact 59, and cut off the heat as before explained. This condition will exist until the temperature drops, when tube 61 will contract, allowing the circuit to again be closed.

As the cam continues to revolve the end of lever 54 will ride on the eccentric surface 100, and move levers 54 and 57 to the left, as viewed in Fig. 6, increasing the distance between pin 63 and lug 62, so that the tube 61 can expand without breaking the circuit. Lever 54 is in contact with surface 100 for about 25 minutes and in this time the temperature is raised to about 325°.

Lever 54 then rides on concentric surface 90 of the cam, and during this period, which lasts about one hour, the temperature remains fairly constant. When the end of surface 90 reaches the edge 53, lever 54 is pulled to the right (Fig. 6), by spring 54', the circuit is broken between the lever and contact 58, the magnet 28 is deenergized, and the steam which has been generated in pot 3 allowed to escape as before explained. The top 17 may then be taken off and the basket and flasks removed.

What I claim as my invention and desire to secure by Letters Patent of the United States is:

1. A vulcanizer comprising in combination a chamber, temperature responsive means disposed in the bottom of said chamber, electrical heating means for said chamber, a source of electrical energy, connecting means for joining the temperature responsive means and the heating means to said source of electrical energy, an electrically controlled blow-off valve mounted in the top of said chamber, and means for connecting said blow-off valve to said source of electrical energy.

2. A vulcanizer comprising in combination a chamber, having its walls insulated, a temperature responsive means disposed in the bottom of said chamber, a heating element mounted in the base supporting said chamber, contacts on said heating element, connections for joining said contacts and the temperature responsive means to a clock mechanism, said clock mechanism comprising a shaft having a cam mounted thereon, and a lever adapted to contact said cam at predetermined intervals.

3. A vulcanizer comprising in combination a chamber, temperature responsive means disposed horizontally in the bottom of said chamber, a lever, a tube susceptible to pressure changes mounted in close proximity to said lever, means for connecting the said lever and temperature responsive means, another lever extending vertically from said first named lever, and a clock mechanism mounted closely adjacent to said last named lever.

4. A vulcanizer comprising in combination a chamber, temperature responsive means disposed in the bottom of said chamber, a lever, a tube susceptible to pressure changes mounted in close proximity to said lever, means for connecting the said lever and temperature responsive means, another lever extending vertically from said first named lever, a shaft, a cam mounted on said shaft, and means for causing the last named lever to contact said cam.

5. A vulcanizer comprising in combination a chamber provided with a cover, temperature responsive means disposed in the bottom of said chamber, and an electrically controlled blow-off valve mounted in the cover, said blow-off valve comprising sectional chambers, and an outlet in said bottom sectional chamber provided with a whistle.

6. A vulcanizer comprising a vulcanizer pot, automatic means to heat said pot to a predetermined temperature in a predetermined time, and to hold said predetermined temperature for a later predetermined duration of time.

MILTON M. KOHN.